United States Patent [19]

Ramser et al.

[11] 3,976,032

[45] Aug. 24, 1976

[54] POULTRY MAINTENANCE SYSTEM HAVING MOVING CAGES

[75] Inventors: Forrest L. Ramser, Athens, Ga.; Mark Skinner, Decatur, Ala.

[73] Assignee: Chore-Time Equipment, Inc., Milford, Ind.

[22] Filed: Apr. 16, 1975

[21] Appl. No.: 568,795

[52] U.S. Cl. ............................ 119/18; 119/22; 119/48
[51] Int. Cl.² ........................................ A01K 31/16
[58] Field of Search .................. 119/48, 18, 22; 104/102, 162; 198/85

[56] References Cited
UNITED STATES PATENTS

| | | | |
|---|---|---|---|
| 3,045,612 | 7/1962 | Byrnes | 119/48 X |
| 3,075,495 | 1/1963 | Steterau et al. | 119/48 X |
| 3,131,647 | 5/1964 | Hawley | 104/162 |
| 3,867,903 | 2/1975 | Fleshman | 119/48 |

*Primary Examiner*—Hugh R. Chamblee
*Attorney, Agent, or Firm*—Olson, Trexler, Wolters, Bushnell & Fosse, Ltd.

[57] ABSTRACT

Apparatus is provided for maintaining a flock of poultry or the like. The system includes a number of cages which are transported in opposite directions along parallel paths. Upon reaching a path end, each cage is transferred in a straight line to an opposite transport device, and thus moves in a non-revolving, do-si-do pattern. Beside the path of cage movement, feeding, watering and egg collecting subsystems are provided. Poultry droppings are accumulated on collecting pans below each cage and are removed by scrapers which clean the pans as the pans pass a collecting point.

27 Claims, 10 Drawing Figures

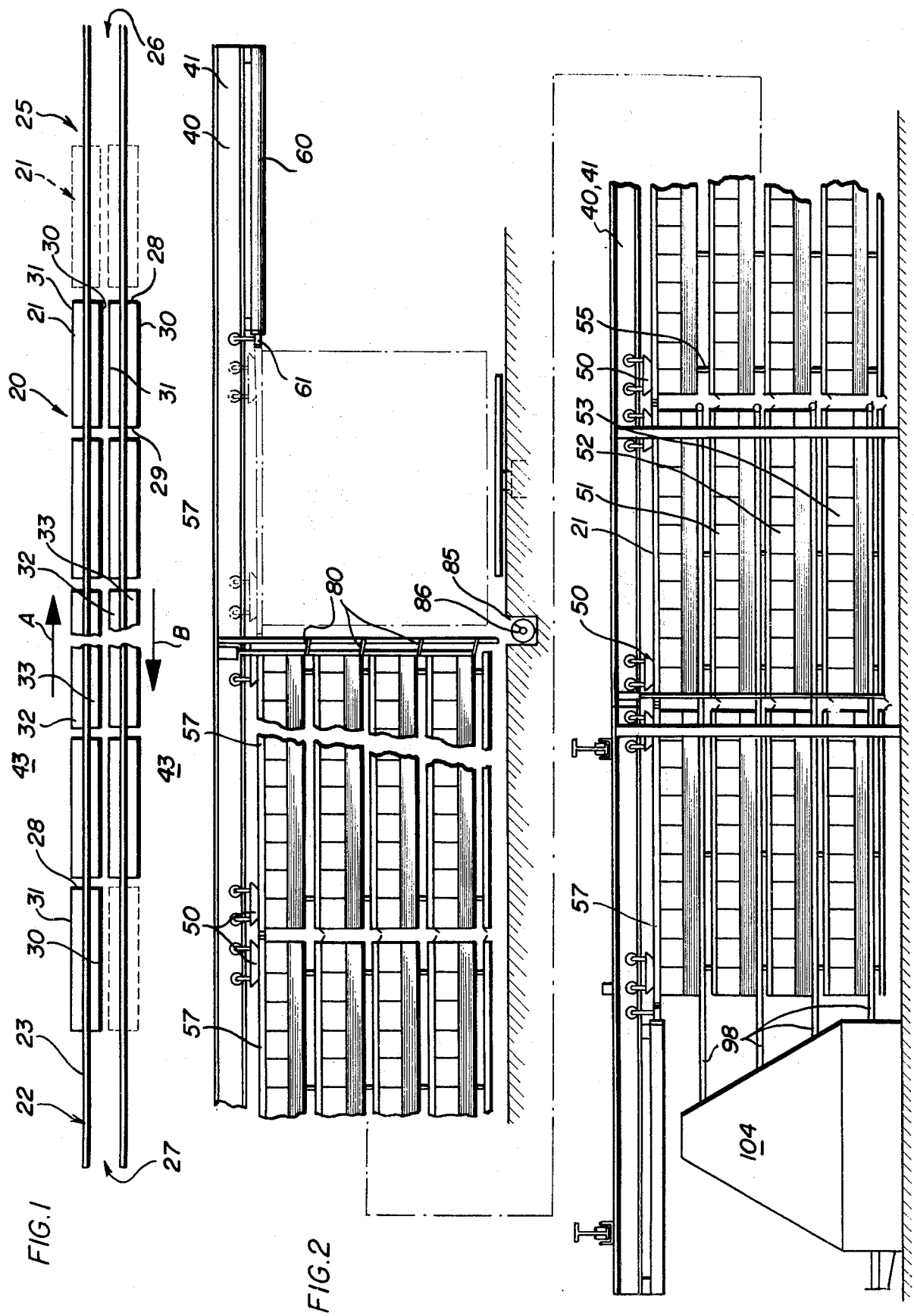

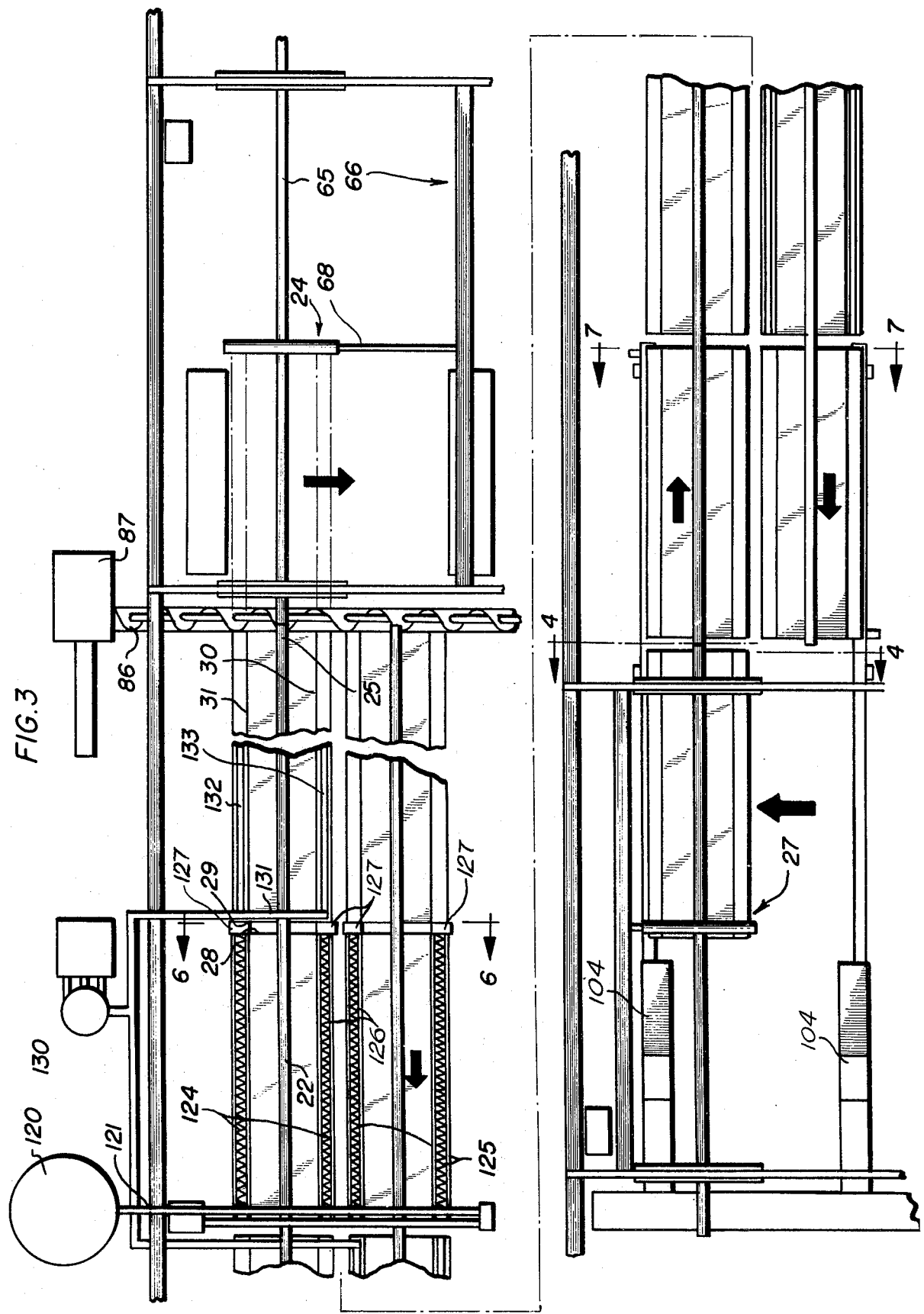

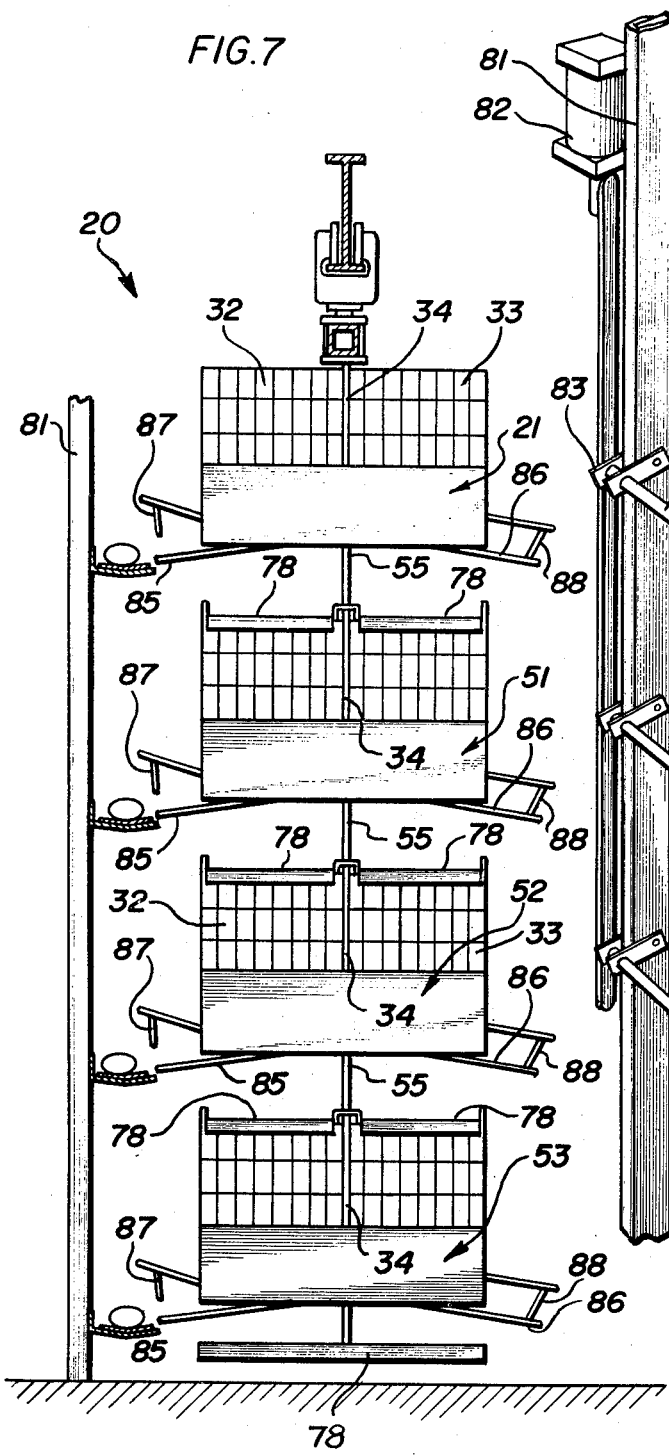
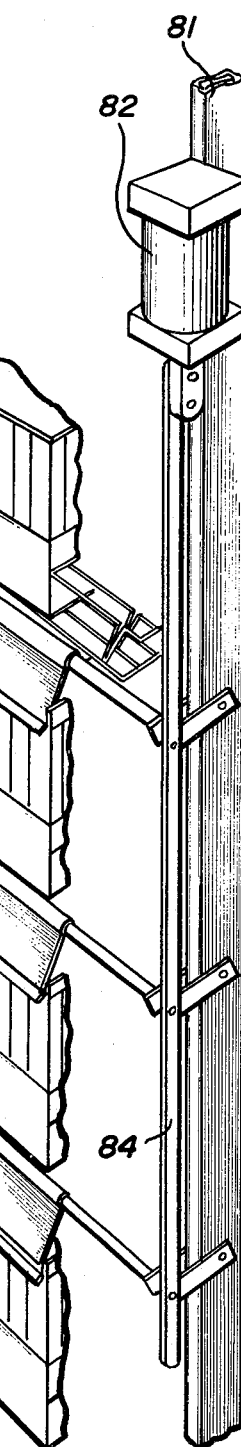
FIG.7
FIG.8

POULTRY MAINTENANCE SYSTEM HAVING MOVING CAGES

BACKGROUND OF THE INVENTION

This invention relates generally to poultry flock maintenance systems and the like, and more particularly concerns a maintenance system which moves cages and caged birds past relatively stationary subsystems for feeding and watering the hens, for removing eggs and manure or droppings, and for providing other bird services.

In modern poultry operations, relatively sophisticated equipment permits large flocks of poultry to be raised to and maintained at high levels of performance with relatively small amounts of hand labor and husbandman attention. To the extent that flock maintenance equipment costs and raw material costs can be minimized, successful, profitable poultry business is encouraged. It has been found that flock efficiency can be maximized in many cases by caging the fowl and restricting the movement of each bird to a relatively small area.

However, when fowl are caged, provision must be made for providing bird access to feed and water supplies. Manure removal must also be provided for. For some flocks, egg removal and collection subsystems are required. Artificial insemination and other bird care services may be necessary in other operations.

In some poultry businesses, it is desirable to care for several disparate flocks. For example, the husbandman may wish to maintain two laying flocks and one breeding flock simultaneously. Poultry maintenance equipment should be able to accomplish these tasks at minimum cost. If necessary, it should be possible to install egg collecting equipment at points to service some poultry cages which contain laying hens; other cages of the system can contain broiling poultry and may not require identical egg removal equipment.

Accordingly, it is the general object of the present invention to provide apparatus for maintaining large numbers of birds in a way which maximizes flock performance and minimizes equipment costs.

It is a more specific object of the invention to provide apparatus which closely governs and controls the amount of feed and water made available to each member of the laying flock, thereby encouraging uniformly high performance or efficiency from each hen. A related object of the invention is to provide apparatus which maintains the flock at maximum productivity with minimum effort and attention on the part of the poultry husbandman.

Another object is to provide apparatus which controls the times during which each bird has access to the feed and the water.

A further object is to provide apparatus for maintaining a poultry flock wherein subsystem apparatus for feed delivery, water delivery, egg collection, and manure or droppings removal and the like can be simplified and the costs of such subsystem apparatus and components minimized. A related object is to simplify the job of populating and depopulating the poultry house.

Yet another object is to provide apparatus for compactly maintaining a relatively large flock in a rectilinear poultry house. A related object is to provide such apparatus in a form which takes maximum advantage of the poultry house internal space shape. Another related object is to provide such apparatus in a form permitting easy service and adjustment.

A still further object is to provide an equipment system which can be designed or arranged to provide relatively customized care for different types of poultry in different areas of a single poultry house.

It is yet another object of the invention to provide flock maintenance equipment which will accomplish the foregoing objectives at minimal costs, yet which is reliable and rugged in operation.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a schematic top plan view showing in general form the poultry maintenance system and the path of movement of poultry-containing cages about the apparatus;

FIG. 2 is a fragmentary elevational view showing in further detail the poultry-containing mobile cages and associated egg collecting and other service apparatus;

FIG. 3 is a fragmentary top plan view showing in further detail the mobile cages, cage transfer apparatus, and associated feed delivery, water delivery, and droppings removal systems;

FIG. 7 is a sectional view taken substantially in the plane of line 7—7 in FIG. 3 and showing in further detail the traveling cages as they appear when located adjacent activated egg collecting apparatus;

FIG. 8 is a fragmentary perspective view showing portions of the hen-containing cages and as they appear when located adjacent activated droppings removing apparatus;

DETAILED DESCRIPTION

Figure 4:
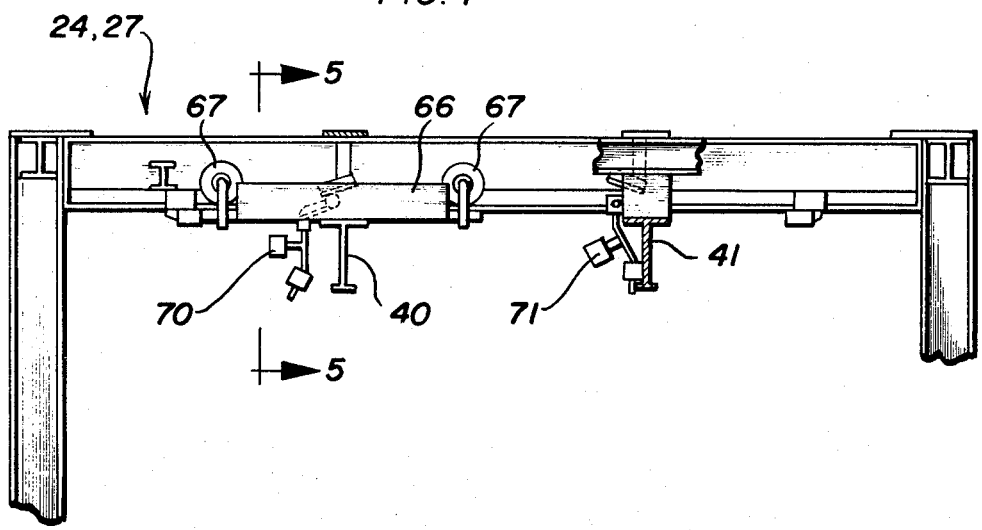
FIG. 4 is a sectional view taken substantially in the plane of line 4—4 in FIG. 3 showing in further detail the cage transfer crane mechanism.

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Cages and Cage Movement Apparatus

Turning first to FIGS. 1–3, there is shown the novel poultry maintenance system 20 in its general aspect. Broadly speaking, this system 20 includes a number of poultry-restraining, elongated, bi-ended, bi-sided, bi-compartmented cages 21. These cages are adapted, as is explained in further detail below, to move in the direction indicated by the arrow A in FIG. 1 along a first transport device 22, which here comprises an overhead rail 23. As the cages 21 reach an end of the first transport mechanism 22, they are transferred, as by first cage transfer device 24 (see FIGS. 4 and 5), to a second transport means 25 which here comprises an overhead rail 26 for cage motion along a second path generally opposite in direction but parallel to or aligned with the first cage path of motion, as indicated generally by the letter B in FIG. 1. Upon reaching the downstream travel limit or end of motion along the second transport means 25, the cages are again individually transferred in seriatim order by a second cage transfer means 27 back to the first transport means 22.

To retain the poultry, each cage 21 is defined by a first end 28 and a second end 29, and remaining portions of the cage perimeter are defined by a first side 30 and a second side 31. A common back member 34 (see FIG. 6) divides each cage into two compartments 32 and 33. Each cage may be further divided into individual stalls (not shown) within a compartment, if desired, to further restrain the movement of fowl within the cage.

In accordance with the invention, it will be noted that the cages are moved about the poultry maintenance system along straight-line paths in a nonrevolving do-si-do pattern. As the cage 21 travels along the first transport path, the first cage end 28 leads and the second cage end 29 follows. As the cage is moved from the first transport means 22 to the second transport means 25 by the first transfer means 24, the first cage side 30 leads and the second cage side 31 follows. Then, as the cage moves back along the second transport means 25, the second end 29 leads, and the first cage end 28 follows. At the second transfer means 27, the cage is transferred back to the first transport means 22 with the second cage side 31 leading and the first cage side 30 following. In this form, the apparatus is compact, yet can accommodate relatively large numbers of birds. Relatively great advantage is taken of the rectilinearly shaped space available within a poultry house of normal configuration.

In carrying out the invention, each topmost cage 21 is suspended from two or more trucks 50 beneath the overhead transport rails 23 and 26 (FIG. 2). These trucks 50 are provided with wheels or other convenient structure to cause the trucks 50 and suspended cages to follow the rails 23 and 26 along a path corresponding to the transport devices 22 and 25. By using this plurality of trucks for each cage stack, sway and wobble of even relatively large suspended cages is minimized, thus increasing poultry security. For increased poultry capacity, a plurality of vertically arrayed cages 51–53 organized one below another can be suspended from the trucks 50, each cage being supported from its own support device 55, as best illustrated in FIG. 7.

Above the top cage 21 in each vertical array is here mounted a cage bumper 57 positioned to abut adjacent bumpers as shown in FIG. 2. Below each transport rail 23 and 26 is a cage drive means such as a hydraulic cylinder 60 having a piston rod 61 positioned for abutting engagement with an adjacent bumper 57. When the piston rod 61 extends, the cage bumper 57 is engaged, and the suspended cages 21 and 51–53 are pushed along the associated transport device 22 or 25.

It is to be noted that the piston rod 61 has a length equal to or slightly longer than the length of the cage 21 and bumper 57. Thus, when the piston rod 61 is fully extended and then withdrawn, a clear space is left beneath the transport rail 23 or 26 which is sufficiently large to permit the addition of a succeeding cage to the transport device, as can be envisioned from FIGS. 2 and 3. As each succeeding cage is added to the transport rail 40 or 41 and the fluid power cylinder is energized to extend the piston rod 61, each succeeding cage bumper 57 is engaged and urges the preceeding abutted bumper and cage along the transport rail. In this way, each cage is moved along the transport device toward a downstream end.

Figure 5:
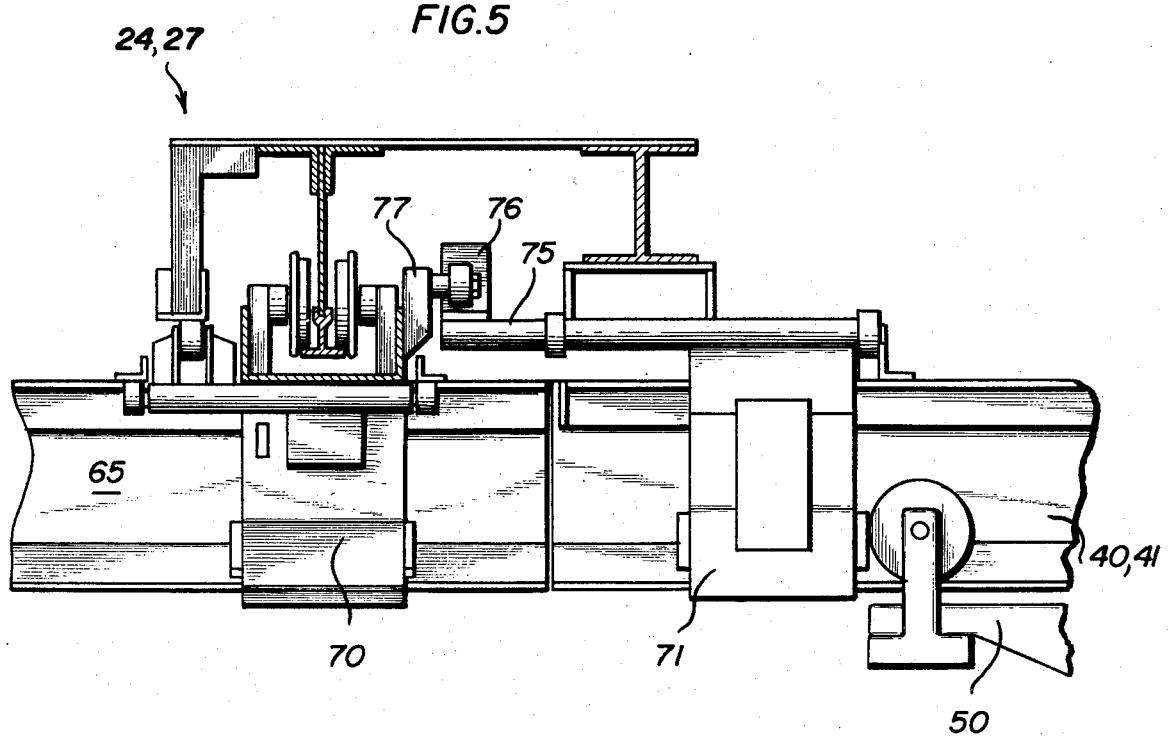
FIG. 5 is a fragmentary sectional view taken substantially in the plane of line 5—5 in FIG. 4 and showing in further detail the cage transfer crane mechanism.

At each transport device downstream end, the cages are transferred to the opposite transport device by cage transfer devices 24 and 27 such as those illustrated in FIGS. 3–5. Here, these transfer devices each include a rail 65 which is mounted upon an overhead crane structure 66. As illustrated particularly in FIG. 4, this rail 65 can be suspended by wheels 67 or other convenient apparatus so as to be moved between a position of alignment with the first transport means 22 and a position of alignment with the second transport means 25. Power to move this transfer rail 65 between the two indicated positions can be provided by a fluid power cylinder 68 or other convenient means.

To prohibit the cage trucks 50 from rolling off the end of the transport rails 22 or 25 or the transfer rail 65, stop devices 70 and 71, as shown in FIGS. 4 and 5, are provided. These stop devices 70 and 71 here each include a pivotable head 73 journalled upon a cross-shaft 75. As the transfer rail 65 is moved into alignment with the transport rail 22 or 25, interengagement of stop device crank arms 76 and 77 permit mutual opening of the stop devices. When the stop devices 70 and 71 are opened, the cage truck 50 can be pushed from one of the aligned rails to the other.

Droppings Removal Apparatus

As illustrated particularly in FIGS. 3, 7 and 8, the poultry maintenance system 20 is equipped to automatically remove droppings or poultry manure from the system. This removal equipment is low in cost and is arranged for easy servicing. In accordance with the invention, therefore, a pan 78 is provided below each cage 51–53, which is capable of retaining droppings fallen from the cage above. As illustrated here, many of these pans can be mounted atop a cage 52 immediately below the cage 51 which the pan 78 services.

To remove accumulated droppings, pivotable scrapers 80 carried on a framework 81 are positioned and adapted to scrape droppings from each pan 78. This is here accomplished by a fluid power device such as a cylinder 82 which is connected, by cranks 83 and arms 84, so as to lower the scrapers 80 into engagement with the respective pans 78 and then provide a positive pressure to the blades so as to thoroughly clean and scrape each pan as it passes the scraper.

In carrying out this aspect of the invention, the scraped droppings fall, as illustrated in FIG. 2, from these pans into a trough 85, here positioned generally beneath the poultry maintenance system 20. Within the trough 85 is an auger 86 adapted to move the droppings to a collector 87 for removal from the system.

Egg Collecting Apparatus

As illustrated particularly in FIGS. 2, 6, 7, 9 and 10, apparatus is provided for the quick and efficient removal of eggs from the poultry cages when a laying flock is being maintained or cared for. This equipment is located outside the area of cage movement for easy servicing. In accordance with this aspect of the invention, each compartment 32 and 33 of each cage 21 and 51–53 is provided with an inclined floor 85 or 86. Gates 87 and 88 meet the corresponding floors 85 and 86 and are positioned to intercept eggs 90 rolling down the inclined floors 85 and 86 to keep the eggs from rolling off floor edges 91 and 92. In the illustrated embodiment, these floors 85 and 86 and gates 87 and 88 extend outside the space enclosed by the cage sides 30 and 31 for easy manipulation and access by related system equipment.

Figure 10:
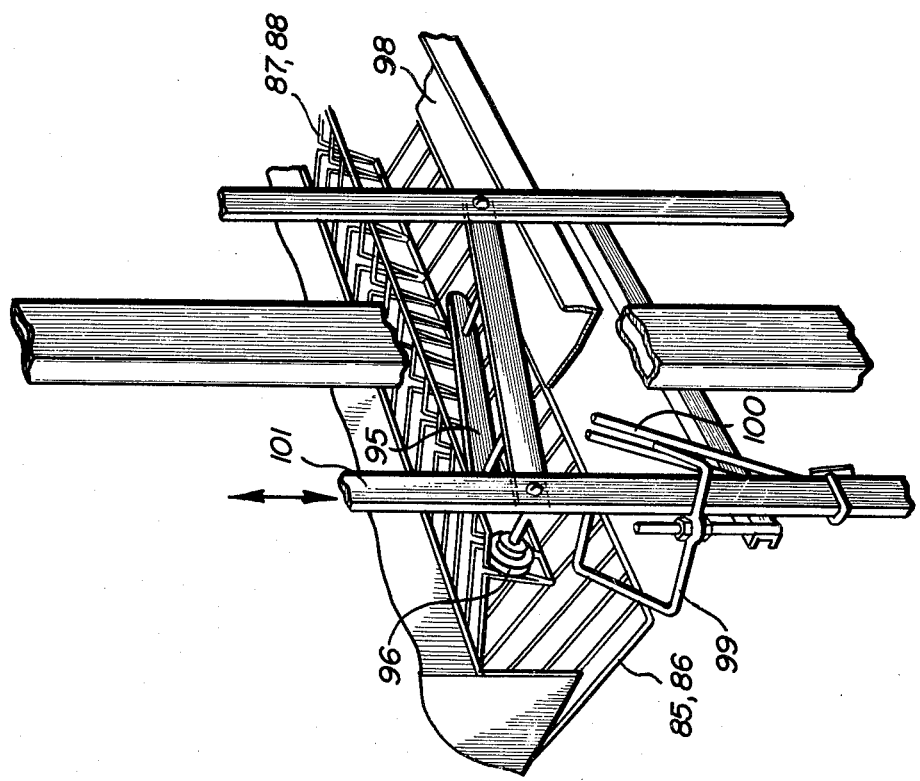
FIG. 10 is a fragmentary perspective view showing in further detail the egg collecting apparatus in FIG. 9.
Figure 9:
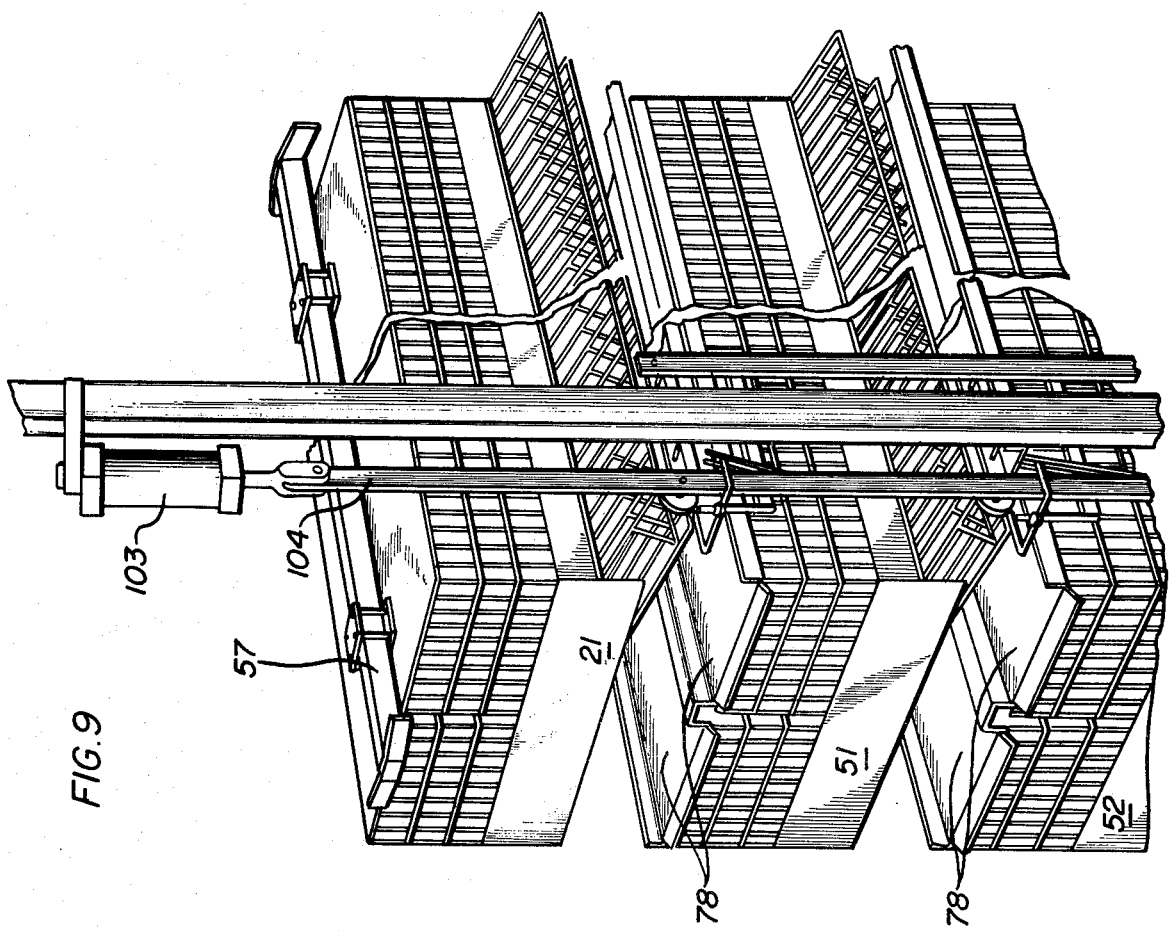
FIG. 9 is a fragmentary perspective view showing the poultry containing cages as they appear when located adjacent activated egg-collection apparatus.

To rapidly and efficiently collect the eggs, a gate cam such as that illustrated in FIGS. 9 and 10 is provided at a fixed egg collecting point on each outer side 41 of the cage movement area. In the illustrated embodiment, this cam includes a fixed cam 95 adapted to engage and lift the gate 87 or 88, and a roller cam 96 adapted to maintain the gate in its raised position as the cage travels past the egg collecting point.

When the gate is raised as illustrated in FIG. 10, the eggs are allowed to roll out off the edge of the floor and onto a conveyor belt 98 positioned adjacent the floor. Egg transfer between the floor 85 or 86 and the conveyor belt 98 is assisted by a transfer cam 99 which is swung into position between the floor and the conveyor belt by a finger cam 100 carried upon a mobile arm 101. This same arm 101 is here used to raise the gate cams 95 and 96 from their lowered, inactive positions to the active gate-engaging egg release positions, as by a fluid power cylinder 103 as shown in FIGS. 9 and 10. The eggs are moved along the conveyor belts 98 to a centralized egg collector 104 for removal to packing or other equipment.

Two egg collectors can be provided, as illustrated in FIG. 3, one being located on each outer side of the apparatus. One collector lifts the cage gates and receives the eggs from one set of compartments 32. When the cages are transferred to the other side of the apparatus, as explained above, the opposite compartments 33 are presented to the second egg collector.

Feed Supply Apparatus

Figure 6:
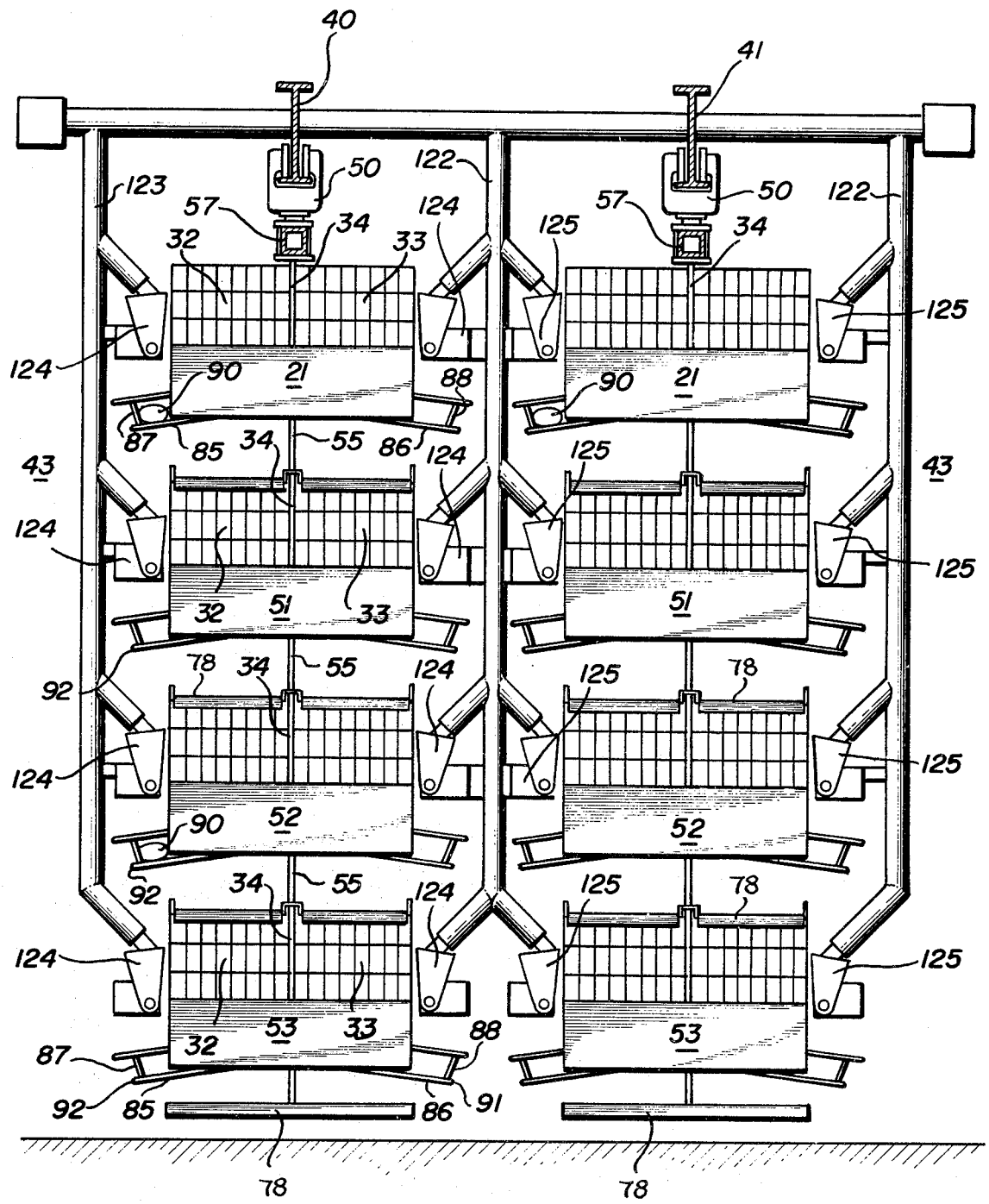
FIG. 6 is an elevational sectional view taken substantially in the plane of line 6—6 in FIG. 3 and showing in yet further detail the hen-containing cages and the transport mechanism and associated service systems.

In carrying out the invention, means are provided for supplying feed to the poultry carried within the cages at fixed feed supply points past which the cages travel. To this end, as shown in FIGS. 3 and 6, feed is stored in a fixed bin device 120 and is moved, as by a header conveyor 121, to a plurality of feed dispensing drop tubes 122 and 123 where it flows into open topped trough conveyors 124 and 125. Augers 126 carried within the troughs are rotated by motors 127 to move the feed along the trough and present it for access and consumption by the caged poultry.

In the illustrated embodiments, four sets of troughs are provided adjacent the cage sides. It is contemplated that transport rails 40 and 41 of 300 or more feet in maximum length can be provided in poultry houses of appropriate size. To facilitate feed handling and feed management, the illustrated troughs are relatively short, and can be on the order of 30 to 60 feet in length. To adequately supply the birds with feed, the troughs are preferably extend over a distance equal to or greater than the length of a poultry cage. When the apparatus includes transport rails of long lengths, additional feeding troughs can be provided at several points to increase the amount of feed made available to the birds during each cycle of cage movement.

Water Supply Apparatus

It is yet another feature of the invention that water is supplied to the poultry at points downstream of the feed supply troughs; i.e. water is made available to the poultry subsequent to their travel past the feed supply. To this end, water is provided in a storage tank 130, and is drawn, as by appropriate piping 131, to open-topped water troughs 132 and 133 (FIG. 3). If several sets of feeding troughs are provided, watering troughs can be located adjacent each feeding trough. By this arrangement, the contained poultry are presented with a controlled quantity and quality of feed, and are thereafter presented with a controlled quantity and quality of water, thus encouraging good flock health and high performance. Slight separation of each feed and water trough discourages the fowl from accidentally dropping feed in the water, and promote water supply cleanliness. Each water trough can also extend over a distance equal to or greater than the length of a poultry cage.

Operation

If desired, appropriate time clocks or other intermittent timing apparatus (not shown) can be employed to cycle the cages past the feeding and watering points. After the flock has been fed and watered, the cage drive cylinders 60 are deactivated, thus conserving operating energy and allowing the flock to become relatively dormant. Further energy conservation can be obtained by programming the timing apparatus to operate certain service subsystems less often than every cage movement cycle. For example, if dropping output is low, the scrapers 80 may be rotated into position to engage the cage roofs 78 every, say, third cage movement cycle. Egg collection perhaps may be required only during every second cage movement cycle; if the egg collectors 104 are operated on this basis, system operating power requirements are lessened and monitoring labor burdens are eased.

The lighting inside the poultry house can also be turned on and off by timing apparatus. During darkened periods, other maintenance equipment operations can be halted by timers to provide a poultry rest period. A wide variety of equipment operating and house lighting cycle programs will suggest themselves to those skilled in the art of poultry care.

The invention is claimed as follows:

1. Apparatus for maintaining a flock of poultry or the like, comprising a plurality of poultry cages, first transport means for moving the cages along a first path direction with a first cage end leading and a second cage end following, first cage drive means for urging the cage along the transport means, second transport means for moving the cage along a second path direction generally adjacent to but opposite the first path direction with the first cage end following and the second cage end leading, second cage drive means for urging the cage along the second transport means, first transfer means including a straight track for alignment with said first transfer means to receive at least one cage therefrom, drive means for moving said track and received cage from said first transport means to said second transport means in a straight line into alignment with the second transport means for transferring the cage to the second transport means and second transfer means including a straight track for alignment with said second transport means to receive at least one cage therefrom, drive means for moving said track and received cage from said second transport means in a straight line to said first transport means, and stop means for preventing the cage retained on a transfer means from moving off the transfer means unless the transfer means is aligned with a transport means whereby the cage is safely moved from the first transport means to the first transfer means to the second transport means to the second transfer means and back to the first transport means in a rectilinear, nonrevolving, do-si-do pattern.

2. Apparatus according to claim 1 including a plurality of separate cage trucks for carrying each cage along a path following the transport means and for guiding the cage along a path corresponding to the transport means, and a cage support for supporting the cage and attaching the cage to the cage trucks.

3. Apparatus according to claim 2 including a plurality of cage trucks and a corresponding plurality of cage bumpers positioned to abut one another and urge preceeding abutted bumpers along the transport means.

4. Apparatus according to claim 3 wherein said cage driving means includes means for engaging an adjacent cage bumper and urging the cage bumper and the corresponding cage along the transfer means.

5. Apparatus according to claim 4 including separate cage driving means associated with each cage transport means.

6. Apparatus according to claim 2 including means for supporting a plurality of cages one below another in vertical array, and means for supporting the vertical array beneath the cage truck and transport means.

7. Apparatus according to claim 6 wherein a pan member is provided below each cage, the pan being capable of retaining droppings fallen from the cage above, and further including dropping scraper means located at a fixed droppings accumulation point and adapted to scrape the droppings from each pan member as the pan member travels past the accumulation point.

8. Apparatus according to claim 7 wherein said scraper means is adapted to drop the scraped droppings into a trough, and including collector transfer means for conveying droppings in the trough to a removal point.

9. Apparatus according to claim 1 wherein said cages include inclined egg collecting floors, and gate means positioned to intercept eggs rolling down the inclined floor and keep the eggs from rolling off the floor edge.

10. Apparatus according to claim 9 wherein said floor and said egg-intercepting gate extend outside the space enclosed by the cage sides.

11. Apparatus according to claim 9 including cam means located at a fixed egg collecting point and positioned to engage and lift the cage gate as the cage travels past the egg collecting point sufficiently to permit retained eggs to roll off the cage floor and into an egg collector.

12. Apparatus according to claim 11 wherein said gate includes gate flange means positioned for engagement by the cam, and said cam means includes inclined ramp means for engaging the gate flange means as the cage and gate approach the fixed egg collecting point, and roller means for maintaining the gate in its raised position as the cage and gate travel past the egg collecting point.

13. Apparatus according to claim 11 including cam actuating means for moving the cam from an inactive position to an active position for engaging and raising said gate.

14. Apparatus according to claim 1 including means for supplying feed to poultry within the cages located at a fixed feed supply point past which the cage travels.

15. Apparatus according to claim 14 wherein said feed supply means includes an open topped trough, and auger means in the trough for moving feed along the trough.

16. Apparatus according to claim 1 including means for supplying water to poultry within the cages located at a fixed water supply point past which the cage travels.

17. Apparatus according to claim 1 including a stationary water trough for supplying the caged poultry with water, said water trough being located at a fixed water supply point post which said movable cage travels and at a position substantially adjacent to said feed supply trough but at a position reached by the moving cage subsequent to its travel point, the adjacent feed supply point, whereby the poultry in a cage are provided with access first to feed and then to water.

18. Apparatus according to claim 1 including a plurality of said feeding troughs spaced along the length of said transport means.

19. Apparatus according to claim 18 including a corresponding plurality of watering troughs spaced along the length of said transport means adjacent said feeding troughs but at a position reached by the moving cage subsequent to its travel post, the adjacent feed supply point, whereby the poultry in a cage are provided with access first to feed and then to water.

20. Apparatus for maintaining poultry and the like, comprising at least one elongated bi-compartmented poultry cage each compartment being further divided into a plurality of stalls, first transport means, a plurality of separate cage trucks for carrying the cage along the transport means in a first path direction with a first cage end leading and a second cage end following, a first cage compartment being carried along an inside of the apparatus and a second outer cage compartment being carried along an outside of the apparatus, when the cage moves along the first transport means and second transport means located closer to the first transport means than the length of the cage for moving the cage trucks and cage along a second path direction compactly adjacent to but opposite the first path direction with the first cage end following and the second cage end leading, the first cage compartment being carried along the outside of the apparatus and the second cage side being carried along the inside of the apparatus when the cage moves along the second transport means including first cage transfer means for transferring the cage from the first transport means to the second transport means along a straight path without reversing the orientation of the cage, and second cage transfer means for transferring the cage from the second transport means to the first transport means along a straight path without reversing the orientation of the cage, whereby the cage is moved about the apparatus in a nonrevolving pattern, each transfer means including means for receiving said cage from one of said transport means, and means for moving said cage-receiving means between alignment with said first transport means and alignment with said second transport means for delivering said cage to the other transport means.

21. Apparatus according to claim 20 including means for supporting a plurality of cages at points between the cage compartments one below another in vertical array, and means for supporting the vertical cage array beneath the cage trucks and transport means.

22. Apparatus according to claim 21 wherein each cage compartment is provided with a pan member below said cage capable of retaining droppings fallen from the cage compartment above, the apparatus further including dropping scraper means located at a fixed droppings accumulation point and adapted to selectively engage the pan members and scrape the droppings from each pan member as the pan member travels past the droppings accumulation point.

23. Apparatus according to claim 20 wherein each cage compartment in an individual cage includes an inclined egg collecting floor sloping downwardly away from said cage common compartment back, and two gate means, each gate means being located outside the cage side and positioned to intercept eggs rolling down the inclined floor to keep the eggs from rolling off the floor edge.

24. Apparatus according to claim 23 including two cam means, each cam means being located adjacent an outside of the apparatus at a respective fixed egg collecting point and positioned to engage and lift the cage gate as the cage travels past the respective egg collecting point, the gate being lifted sufficiently to permit retained eggs to roll off the cage floor and into an egg collector.

25. Apparatus according to claim 20 including trough means for supplying feed to the caged poultry, each trough being located at a fixed feed supply point and positioned to permit poultry to obtain feed from said troughs as the poultry cages move past the respective feed supply point.

26. Apparatus according to claim 25 including watering troughs adapted to supply water to the poultry contained within the cages, each trough being located at a fixed water supply point past which the cage travels and at a position substantially adjacent to said feed supply troughs but at a position reached by the moving cage subsequent to its travel past the adjacent feed supply point, whereby the poultry in a first cage compartment are provided with access first to feed and then to water, and the poultry contained in said cage second compartment being next provided with access to feed and then to water.

27. Apparatus for maintaining a flock of poultry or the like, comprising a plurality of poultry cages, each cage having two compartments, a common compartment back and a bumper, first transport means for moving the cage along a first path direction with a first cage end leading and a second cage end following, first cage drive means positioned to engage cage bumper and urge the cage along the transport means, each cage bumper being positioned to engage an adjacent cage bumper and urge that cage and cage bumper along the transport means, a first cage compartment being carried along an inside of the apparatus and a second cage compartment being carried along an outside of the apparatus when the cage moves along the first transport path direction, second transport means for moving the cage along a second path direction generally adjacent to but opposite the first path direction with the first cage end following and the second cage end leading, second cage drive means positioned to engage the cage bumper and urge the cage along the transport means, the first cage compartment being carried along the outside of the apparatus and the second cage compartment being carried along the inside of the apparatus when the cage moves along the second transport path direction, first transfer means including a straight track for moving said cage from said first transport means to said second transport means in a straight line with said first cage compartment leading and said second cage compartment following, and second transfer means including a straight track for moving said cage from said second transport means in a straight line to said first transport means with the first cage compartment following and the second cage compartment leading, whereby the cage is moved from the first transport means to the first transfer means to the second transport means to the second transfer means and back to the first transport means in a rectilinear, nonrevolving, do-si-do pattern.

* * * * *